United States Patent [19]

Matsuda et al.

[11] Patent Number: 6,153,699
[45] Date of Patent: Nov. 28, 2000

[54] PRIMER COMPOSITION FOR POLYVINYL CHLORIDE

[75] Inventors: Hideyuki Matsuda; Takuto Oka, both of Kanagawa, Japan

[73] Assignee: The Yokohama Rubber Co., Ltd., Tokyo, Japan

[21] Appl. No.: 09/213,371

[22] Filed: Dec. 17, 1998

[30] Foreign Application Priority Data

Dec. 19, 1997 [JP] Japan ..................................... 9-350777

[51] Int. Cl.$^7$ ................................ C08F 8/00; C08J 3/00; C08K 3/20; C08L 75/00; C08G 77/04
[52] U.S. Cl. ......................... 525/131; 524/507; 524/588; 524/589; 524/590; 525/123; 525/455; 528/28
[58] Field of Search ..................................... 524/507, 589, 524/590, 588; 525/123, 131, 455; 528/28

[56] References Cited

U.S. PATENT DOCUMENTS 5,886,082  3/1999  Numa et al. ............................ 524/501

*Primary Examiner*—Patrick D. Niland
*Attorney, Agent, or Firm*—Finnegan, Henderson, Farabow, Garrett & Dunner, L.L.P.

[57] ABSTRACT

A primer composition comprising a silicone-modified acrylic resin, a polyisocyanate compound in an amount of 0.5 to 10 parts by weight, and 1,4-butanediol in an amount of 0.01 to 1.0 part by weight, the amounts being based on the weight of the silicone-modified acrylic resin. The primer composition imparts sufficient adhesion to polyurethane base adhesives irrespective of the type of polyvinyl chloride being used as an adherend.

4 Claims, No Drawings

PRIMER COMPOSITION FOR POLYVINYL CHLORIDE

BACKGROUND OF THE INVENTION

1. Field of the Invention

The present invention relates to a primer composition that imparts sufficient adhesion to polyurethane base adhesives irrespective of the kind of polyvinyl chloride.

2. Description of the Related Art

When use is made of polyurethane base adhesives on polyvinyl chloride as an adherend, there have heretofore been used primers containing a polyester resin and an isocyanate compound.

However, not all polyurethane base adhesives are compatible with the primers having the above-described composition. Some primers suffer from a decrease in adhesion itself depending on the type of components to be blended in the adhesive and it is difficult to develop sufficient adhesion by use of conventional primers.

On the other hand, polyvinyl chloride, as an adherend, contains various components in order to have various characteristics. However, addition of some components causes a reduction in adhesion with the adhesive. Generally, soft polyvinyl chloride containing a larger amount of plasticizer tends to be more difficult to adhere.

Recently, so-called module glass that comprises window glass used for a car body whose periphery is covered with polyvinyl chloride has been used more and more widely. Therefore, there has been a keen demand for a primer that allows polyurethane base adhesives to exhibit excellent adhesion to polyvinyl chloride as an adherend in bonding modular glass with other elements.

SUMMARY OF THE INVENTION

According to the present invention, it has now been found that blending a specified polyisocyanate compound and 1,4-butanediol in predetermined amounts to one part by weight of a silicone-modified acrylic resin improves the adhesion of primer. The present invention has been completed based on this discovery.

That is, the present invention provides a primer composition comprising a silicone-modified acrylic resin, a polyisocyanate compound in an amount of 0.5 to 10 parts by weight, and 1,4-butanediol in an amount of 0.01 to 1.0 part by weight, the amounts being based on part by weight of the silicone-modified acrylic resin.

Use of the primer composition of the present invention enables one to impart acceptable adhesion to polyurethane base adhesives, to which the conventional polyester resin/isocyanate compound base primers are difficult to impart sufficient adhesion, irrespective of the type of polyvinyl chloride being used as an adherend.

DETAILED DESCRIPTION OF THE INVENTION

Hereafter, the present invention will be described in detail.

In the present invention, silicone-modified acrylic resins are used. They are acrylic resins modified with a silicone obtained by introducing a silicone bond in the main chain of acrylic resin. Of these, those whose acrylic main chain has been modified with an alkoxysilane (Si(OR)$_n$) are preferred. The alkoxysilane-modified acrylic resin includes products of various grades depending on the amount of modification with alkoxysilane and difference in the backbone due to a difference in the monomer that constitutes the acrylic resin. A preferred example thereof is Gemlac YC-3623 (manufactured by Kaneka Corporation).

Blending the alkoxysilane-modified acrylic resin in a primer allows the alkoxysilane-modified acrylic resin to function as a film-forming component to impart excellent adhesion to an adherend that has a poor adhesion, particularly polyvinyl chloride.

In the present invention, preferred polyisocyanate compounds include adducts of tolylene diisocyanate (TDI) and hexamethylene diisocyanate (HMDI). More specifically, Desmodur HL (manufactured by Bayer AG) having the following chemical structure is used advantageously.

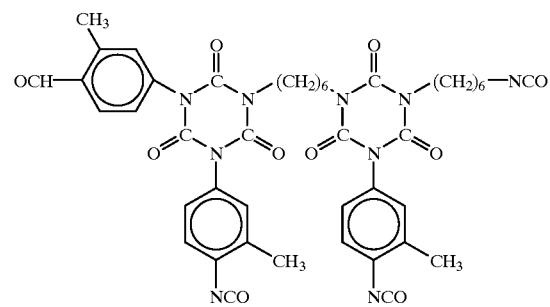

In the present invention, use of the above-specified polyisocyanate compound results in imparting excellent adhesion.

The loading of polyisocyanate compound is 0.5 to 10 parts by weight, preferably 1 to 5 parts by weight, per part of the silicone-modified acrylic resin. With below 0.5 part by weight or above 10 parts by weight of the polyisocyanate compound, the adhesion between the adhesive and an adherend becomes insufficient.

Here, Desmodur HL (manufactured by Bayer AG) contains solids in an amount of 60% by weight and butyl acetate as a solvent in an amount of 40% by weight based on the weight of the total composition and, hence, it is necessary to determine its loading so that the amount corresponding to the solid content is included in the above-specified range when Desmodur HL is used as a polyisocyanate compound.

The primer composition of the present invention further contains 1,4-butanediol. The loading of 1,4-butanediol is 0.01 to 1.0 part by weight, preferably 0.05 to 0.5 part by weight, based on 1.0 part by weight of the silicone-modified acrylic resin. With the loading of 1,4-butanediol being below 0.01 part by weight or above 1.0 part by weight, the adhesion between the adhesive and an adherend becomes insufficient.

The primer composition of the present invention may contain various solvents, if desired.

Various known solvents can be used as far as they are inert to isocyanate groups. More specifically, there can be cited, for example, ester base solvents such as ethyl acetate and butyl acetate, ketone base solvents such as methyl ethyl ketone (MEK) and acetone, aromatic solvents such as toluene, and the like. Preferred are ester base solvents such as ethyl acetate and ketone base solvents such as methyl ethyl ketone (MEK) in view of less adverse effects to human body.

The primer composition of the present invention may, if desired, contain in addition to the above-described components one or more of an antioxidant, an ultraviolet absorber, pigment, a modifier or the like.

The total solid content in the primer is 0.5 to 30% by weight, preferably 1 to 15% by weight. It is preferred in view of viscosity (i.e., ease of coating) and adhesion that a solvent is added so that the total solids content in the primer falls within the above ranges.

As the method of producing the primer composition of the present invention, there can be used various conventional methods that allow sufficient mixing of the respective components. For example, mixing in a ball mill may be used.

The primer composition of the present invention is used advantageously on polyvinyl chloride, ABS (acrylonitrile/butadiene/styrene) and thermoplastic resins having similar adhesion to that of polyvinyl chloride as an adherend. The primer composition of the present invention can be used particularly advantageously on polyvinyl chloride, to which it has been difficult for the conventional primers containing a polyester resin and an isocyanate compound to impart sufficient adhesion. The polyvinyl chloride may be either hard polyvinyl chloride that contains no plasticizer component therein, or soft polyvinyl chloride that is difficult to adhere owing to a plasticizer component therein. Even in the latter case, acceptable adhesion can be obtained by the primer according to the present invention.

Adhesives for which the primer composition of the present invention can be used are preferably polyurethane base adhesives, for example. The primer composition of the present invention may impart acceptable adhesion to any polyurethane base adhesives. Preferred examples of the polyurethane base adhesives include WS-100 (manufactured by Yokohama Rubber Co., Ltd.) and WS-100H (manufactured by Yokohama Rubber Co., Ltd.). However, the present invention is not limited to them.

The counter part or adherend that is bonded to polyvinyl chloride with the primer composition of the present invention and polyurethane base adhesive includes glass, and painted steel plates.

The primer composition of the present invention can be readily cured by standing it at room temperature.

The primer composition of the present invention may be used in a manner similar to that in which conventional isocyanate base primer compositions are used. More particularly, after the primer composition of the present invention is applied on a target position of a substance by a sprayer or the like, the applied substance is left for a suitable time for drying. Then, the target position is bonded by a conventional manner.

The primer composition of the present invention can be used when module glass (resin-covered glass) is attached to a car body. More particularly, the primer composition of the present invention can be used advantageously when: the adherend is a thermoplastic resin such as polyvinyl chloride covering the periphery of module glass; the adhesive is a polyurethane base adhesive; and these are bonded to a polyurethane base sealing material or directly to a painted steel plate surface of a car body.

The primer composition of the present invention can be used advantageously together with polyurethane base adhesives, to which the conventional polyester resin/isocyanate compound base primers are difficult to impart sufficient adhesion, so that acceptable adhesion can be obtained even when the adherend is a sparingly adherent polyvinyl chloride or the like.

EXAMPLES

Hereafter, the present invention will be described in more detail by examples. However, the present invention is by no means limited thereto.

Various primer compositions were prepared in formulations shown on Table 1 and their adhesion was evaluated. To evaluate the adhesion, the primers were each applied on an adherend. After the primer was dried, an adhesive was applied thereon and left for complete curing. Peeling tests on the cured adherends were conducted manually. Table 1 shows the results obtained.

TABLE 1

| | Examples | | | | | | | Comparative Examples | | | | |
|---|---|---|---|---|---|---|---|---|---|---|---|---|
| | 1 | 2 | 3 | 4 | 5 | 6 | 7 | 1 | 2 | 3 | 4 | 5 |
| Component | | | | | | | | | | | | |
| Resin 1 | 1.0 | 1.0 | 1.0 | 1.0 | 1.0 | 1.0 | 1.0 | 1.0 | 1.0 | 1.0 | 1.0 | |
| Resin 2 | | | | | | | | | | | | 1.0 |
| Desmodur HL | 0.5 | 3.0 | 5.0 | 10 | 5.0 | 5.0 | 5.0 | 0.1 | 30 | 5.0 | 5.0 | 5.0 |
| 1,4-butane-diol | 0.1 | 0.1 | 0.1 | 0.1 | 0.01 | 0.1 | 1.0 | 0.1 | 0.1 | — | 5.0 | 0.1 |
| Ethyl acetate | 100 | 100 | 100 | 100 | 100 | 100 | 100 | 100 | 100 | 100 | 100 | 100 |
| Peelability | | | | | | | | | | | | |
| (Soft polyvinyl chloride) | | | | | | | | | | | | |
| Adhesive 1 | CF | CF | CF | CF | CF | CF | CF | PS | AF | CF | PS | CF |
| Adhesive 2 | CF | CF | CF | CF | CF | CF | CF | PS | AF | AF | PS | PS |
| (Hard polyvinyl chloride) | | | | | | | | | | | | |
| Adhesive 1 | CF | CF | CF | CF | CF | CF | CF | PS | AF | CF | PS | CF |
| Adhesive 2 | CF | CF | CF | CF | CF | CF | CF | PS | AF | AF | PS | PS |

The descriptions on Table 1 above are as follows:
Resin 1: Gemlac YC-3623 (alkoxysilane-modified acrylic resin, manufactured by Kaneka Corporation)
Resin 2: Pandex T-5205 (polyester resin, manufactured Dai-Nippon Ink and Chemical Industries, Co., Ltd.)
Desmodur HL: Polyisocyanate compound (manufactured by Bayer AG)
Adhesive 1: WS-100 (polyurethane base adhesive, manufactured by Yokohama Rubber Co., Ltd.)
Adhesive 2: WS-100H (hot-melt polyurethane base adhesive, manufactured by Yokohama Rubber Co., Ltd.)
CF: Agglomerates in the adhesive layer were destroyed.
AF: Interface between the primer and the adherend was destroyed.

PS: Interface between the primer and the adhesive was destroyed.

Table 1 above revealed that use of the primer composition of the present invention developed acceptable adhesion for any adhesive and adherend without destroying the interface between the primer and the adherend or that between the primer and the adhesive.

What is claimed is:

1. A primer composition consisting essentially of:
   (a) 0.5 to 30% by weight of solids comprising:
      1 part by weight of a silicone-modified acrylic resin wherein an acrylic main chain is modified with an alkoxysilane by introducing the alkoxysilane into the main chain of the acrylic resin to form a copolymer of the acrylic resin and the alkoxysilane;
      0.5 to 10 parts by weight of a polyisocyanate compound; and
      0.01 to 1.0 part by weight of 1,4-butanediol, the amounts of the polyisocyanate compound and the 1,4-butanediol being based on 1 part by weight of the silicone-modified acrylic resin; and
   (b) 99.5 to 70% by weight of an organic solvent which is inert to isocyanate groups.

2. The primer composition according to claim 1, wherein the polyisocyanate compound is an addition compound of tolylene diisocyanate and hexamethylene diisocyanate.

3. The primer composition according to claim 1, wherein the organic solvent is at least one member selected from the group consisting of ethyl acetate, butyl acetate, methyl ethyl ketone, acetone, and toluene.

4. The primer composition according to claim 1, wherein the organic solvent is selected from the group consisting of a ketone, an ester, and an aromatic solvent.

* * * * *